(12) United States Patent
Ochs et al.

(10) Patent No.: US 12,172,789 B1
(45) Date of Patent: Dec. 24, 2024

(54) AUTOMATED MANIPULATION OF ADJUSTABLE TOTE

(71) Applicant: Amazon Technologies, Inc., Seattle, WA (US)

(72) Inventors: Garett Ochs, Seattle, WA (US); Joshua Arleigh Burright, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 17/936,706

(22) Filed: Sep. 29, 2022

(51) Int. Cl.
| | |
|---|---|
| B65B 59/00 | (2006.01) |
| B25J 9/00 | (2006.01) |
| B25J 9/16 | (2006.01) |
| B25J 13/08 | (2006.01) |
| B65B 5/06 | (2006.01) |

(52) U.S. Cl.
CPC ........... *B65B 59/003* (2019.05); *B25J 9/0093* (2013.01); *B25J 9/1687* (2013.01); *B25J 13/088* (2013.01); *B65B 5/06* (2013.01); *B65B 59/001* (2019.05); *B65B 2210/04* (2013.01)

(58) Field of Classification Search
CPC ....... B65B 59/001; B65B 59/003; B65B 5/06; B65B 2210/04; B25J 9/0093; B25J 9/1687; B25J 13/088
See application file for complete search history.

(56) References Cited

U.S. PATENT DOCUMENTS

| | | | | |
|---|---|---|---|---|
| 8,646,248 | B2 * | 2/2014 | Iwasa | B65B 5/06 |
| | | | | 53/244 |
| 10,745,164 | B2 * | 8/2020 | Prahlad | G06Q 30/0635 |
| 2011/0293397 | A1 * | 12/2011 | Lomerson, Jr. | B25J 15/0616 |
| | | | | 414/800 |
| 2014/0075891 | A1 * | 3/2014 | Hooper | B65B 5/108 |
| | | | | 53/448 |
| 2018/0050833 | A1 * | 2/2018 | Sytema | B65B 5/028 |
| 2018/0134421 | A1 * | 5/2018 | Ponti | B65B 43/10 |
| 2021/0261281 | A1 * | 8/2021 | Engleman | B65B 49/08 |

FOREIGN PATENT DOCUMENTS

WO    WO-2013001203 A1 *  1/2013  ............... B65B 5/08

OTHER PUBLICATIONS

Machine translation of WO-2013001203-A1 to Murano (Year: 2013).*

* cited by examiner

*Primary Examiner* — Thomas M Wittenschlaeger
*Assistant Examiner* — Himchan Song
(74) *Attorney, Agent, or Firm* — Kilpatrick Townsend & Stockton LLP (57) ABSTRACT

Systems, apparatus, and techniques for automated manipulation of an adjustable container are described. An example apparatus includes a gantry and a plurality of motors. The plurality of motors are attached to the gantry. The plurality of motors are adapted to automatically adjust one or more dividers within a container to form a volume around one or more items within the container.

13 Claims, 12 Drawing Sheets

AUTOMATED MANIPULATION OF ADJUSTABLE TOTE

BACKGROUND

The present disclosure relates to an automated system, apparatus, and techniques for manipulating one or more dividers of a container (or tote).

Many facilities (e.g., warehouses, plants, distribution centers, storehouses, factories, etc.) perform tasks such as storing items, packaging items, shipping items, and the like. Such facilities generally use containers (or totes) to transport items to different locations inside and/or outside the facility. When a container reaches its destination, the items are unloaded for further processing (e.g., downstream processing, upstream processing, etc.). For example, a container may be loaded (or filled) with items from a loading dock and transported to a storage location in the facility. In another example, a container may be retrieved from storage and transported to a location in preparation for shipping.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Embodiments describe an automated system for manipulating an adjustable container (also referred to as a tote, receptacle, bin, and the like). For example, certain facilities (e.g., warehouses, plants, distribution centers, storehouses, factories, etc.) may utilize adjustable containers for a variety of facility operations, including, for example, packaging, storage, shipping, and the like. In particular, facilities may use the adjustable containers to form customized packages (e.g., boxes) around one or more items within the adjustable containers. For example, the adjustable container may include one or more (inner) dividers (also referred to as (inner) walls, (inner) guides, (inner) partitions, and the like) that can be adjusted to compact one or more items within the container, such that a package with the minimum possible volume for the one or more items can be formed (or created). A reference example of such an adjustable container may include one or more dividers that are capable of being adjusted to modify one or more dimensions of a containing area for item(s) within the adjustable container. By using adjustable containers to create (or form) customized packaging around items, facilities can significantly reduce the need for void fill (e.g., bubble wrap, etc.) within packaging, reduce packaging material consumption, reduce transport/shipping volumes, etc.

However, one issue with facilities that utilize adjustable containers is that the dividers within the adjustable containers typically have to be manually adjusted in order to form the containing area for the item(s) within the adjustable container. As facilities may be expected to process an ever increasing amount of items, this reliance on manual techniques for adjusting the dividers within adjustable containers can significantly increase the amount of time it takes to form packaging, negatively impacting the performance and efficiency of facility operations.

To address this, embodiments described herein provide automated systems, apparatus, and techniques for automated manipulation of adjustable containers. More specifically, embodiments described herein provide automated systems, apparatus, and techniques for automatically adjusting a position of one or more dividers within an adjustable container. In one embodiment described herein, a manipulation tool performs a durability test of an adjustable container by automatically adjusting the position of divider(s) within an adjustable container. For example, the manipulation tool may rapidly adjust the divider(s) over time to assess how the divider(s) perform over expected, unexpected, and repeated use.

In other embodiments described herein, a manipulation tool automatically adjusts the position of divider(s) within adjustable container(s) as part of facility operations. For example, the manipulation tool can be used to prepare an adjustable container for a facility operation, such as item(s) packaging, by (i) automatically adjusting the divider(s) to create the maximum possible area within the adjustable container for inserting (or placing) item(s), (ii) automatically adjusting the divider(s) to compact the inserted item(s) into a containing area having the minimum possible area within the adjustable container, or (iii) a combination thereof. In some embodiments, the containing area within the adjustable container may be used to form packaging having a containing volume based on the containing area. For example, the packaging may be created based on the configuration of item(s) that is enclosed within the containing area. Such packaging may have dimensions that form a minimum possible volume around the one or more items, allowing for a minimum amount of packaging material to be used when forming the packaging.

Note that while many of the following embodiments describe systems, apparatus, and techniques for manipulating adjustable containers for one or more facility operations (e.g., packaging, shipping, etc.), the systems, apparatus, and techniques described herein can be used in different environments (e.g., retail stores, grocery stores, etc.). In some embodiments, the systems and apparatus described can be used as standalone systems and/or standalone apparatus for manipulating adjustable containers.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Figure 1:
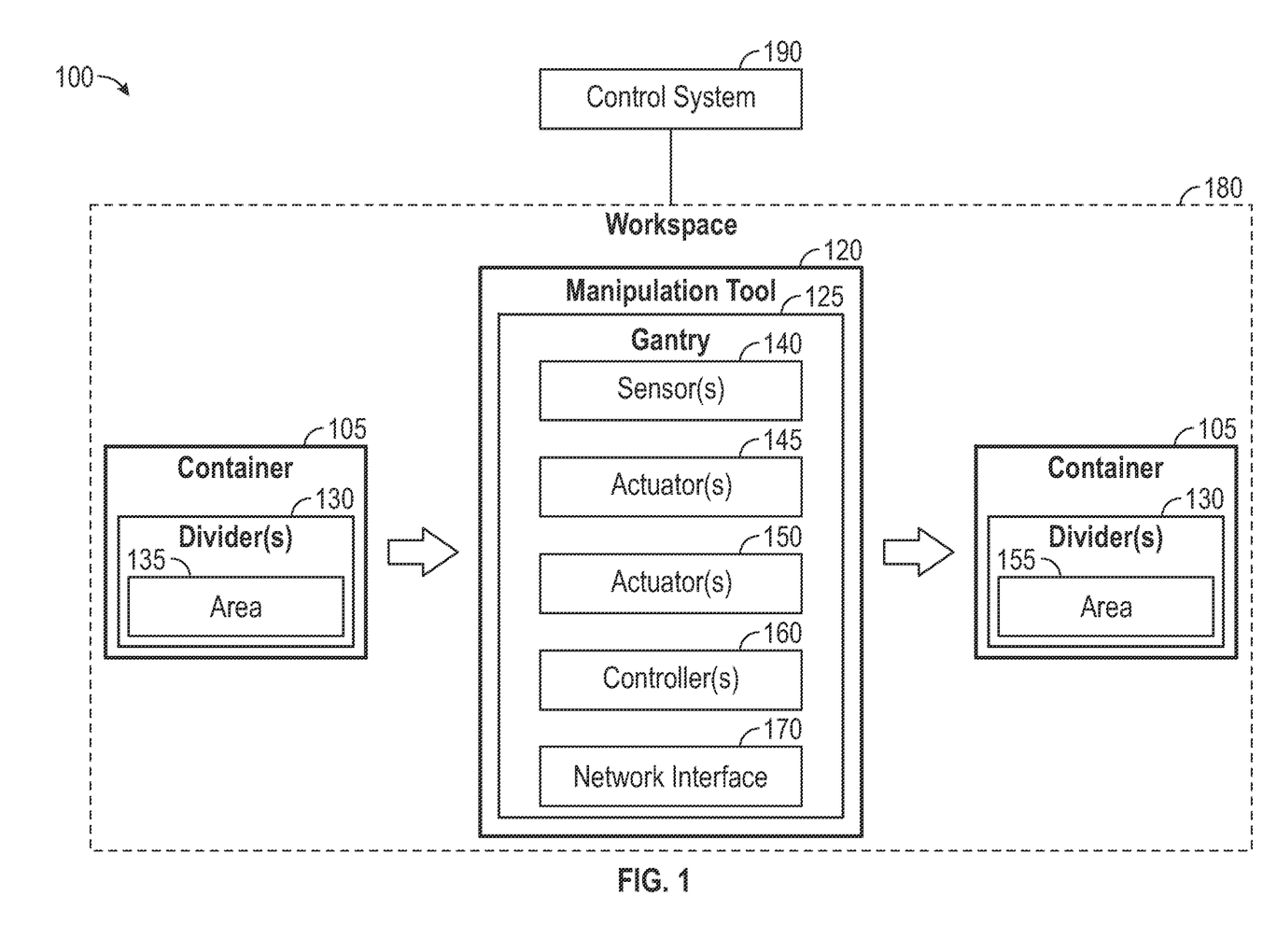
FIG. 1 illustrates an example system for manipulating an adjustable container, according to one embodiment.

FIG. 1 illustrates an example system 100 for automated manipulation of an adjustable container, according to one embodiment. As shown, the system 100 includes a control system 190 and a workspace 180 (also referred to as an equipment area or machine area). The system 100 may be included in any suitable phase(s) of facility operations known to a person of ordinary skill in the art. In one example, the system 100 can be included at a station where empty containers are received and loaded with item(s) for packaging and shipping. In another example, the system 100 can be included at a station where containers undergo durability testing. In another example, the system 100 can be included at a station where emptied containers are received and prepared for loading at another station. Other examples of suitable facility operations may include staging at loading zones, transporting to different areas in the facility, loading off vehicles, and so forth.

In the embodiment depicted in FIG. 1, the workspace 180 includes a manipulation tool 120 (also referred to a manipulation apparatus or a manipulation device). The manipulation tool 120 may receive a container 105 having one or more adjustable dividers 130 that form a (first) area 135 within the container 105. The manipulation tool 120 may manipulate the adjustable divider(s) 130 in order to form a (second) area 155 within the container 105. For example, the manipulation tool 120 may form the area 155 by adjusting a position of the divider(s) 130 within the container 105 in order to modify one or more dimensions of the area 135.

The manipulation tool 120 may include hardware components, software components, or a combination thereof. In the embodiment depicted in FIG. 1, the manipulation tool 120 includes a gantry 125 (also referred to as a gantry stage), which is configured to provide positioning along three perpendicular axes of motion (e.g., X-Y-Z gantry). The gantry 125 may include (or provide support for) various sensors, motors, end effectors, etc. Here, for example, the gantry 125 provides support for one or more sensors 140, one or more actuators 145, one or more actuators 150, one or more controllers 160, and a network interface 170.

The sensor(s) 140 are generally configured to determine a position of one or more dividers 130 within the container 105. As described in greater detail below, the sensor(s) 140 can be deployed in various locations within the workspace 180. For example, one or more sensor(s) 140 may be disposed on (or attached to) on the gantry 125, disposed on (or attached) to the container 105, etc. In one embodiment, one or more sensors 140 are disposed on (or attached to) one or more sides of a container 105. Additionally or alternatively, in one embodiment, one or more sensors 140 are disposed on (or attached to) one or more of the actuators 145 and/or one or more of the actuators 150. The sensor(s) 140 can include laser (detection) sensors, time-of-flight (ToF) sensors, cameras, photoelectric sensors (also referred to as photoeye sensors), etc.

The actuator(s) 145 and actuator(s) 150 are generally configured to manipulate one or more dividers 130 within the container 105. The actuator(s) 145 and actuator(s) 150 may be electric motor actuators (including, for example, alternating current (AC) motor(s), direct current (DC) motor(s), servo motor(s), etc.), pneumatic actuators, hydraulic actuators, vacuum actuators, or any combination thereof. In a particular embodiment, the actuator(s) 145 and actuator(s) 150 are servo-motor actuators. In one embodiment, the actuators(s) 145 are configured to provide motion along a vertical direction (e.g., along a z-axis) and the actuator(s) 150 are configured to provide motion along a horizontal direction (e.g., along an x-axis or along a y-axis).

As described in greater detail below, in one embodiment, each actuator 145 is generally configured to engage a divider 130 within a container 105 in order to allow the divider 130 to be adjusted (or moved) within the container 105. That is, each actuator 145 is configured to allow for compliance (movement) of a divider 130 in a lateral direction (e.g., along x-axis or y-axis) within the container 105. As also described in greater detail below, each actuator 150 is generally configured to move a divider 130 (e.g., in a lateral direction along the x-axis or y-axis) that has been engaged by at least one actuator 145. In this manner, the actuator(s) 145 and actuator(s) 150 can be used to manipulate the position of a divider(s) 130 within a container 105.

The control system 190 generally provides control signals (or commands) to the actuator(s) 145 and actuator(s) 150 in order to control the operation of the manipulation tool 120. For example, the control system 190 may send stop commands, start commands, adjust the speed of the actuator(s), etc. The control system 190 may control the operation of the manipulation tool 120 based at least in part on sensor data received from the sensor(s) 140. For example, the control system 190 may determine a current position of the divider(s) 130 within the container 105 from the sensor data and may start or stop movement of the actuator(s) 145 and/or actuator(s) 150, based on the current position of the divider(s) 130. The control system 190 can include solely hardware and firmware or can include combinations of hardware and software elements. In some embodiments, the control system 190 includes processors or micro-controllers and memory storing executable instructions. In one particular embodiment, the control system 190 is a programmable logic controller (PLC).

The manipulation tool 120 can receive commands from the control system 190 (e.g., using the network interface 170). In addition to receiving information from the control system 190, the manipulation tool 120 can transmit information to the control system 190 (e.g., using the network interface 170). For example, the actuator(s) 145 and/or actuator(s) 150 can send actuator feedback (e.g., information regarding position(s) of the actuator(s), such as actuator stroke position) to the control system 190, the sensor(s) 140 can send information regarding positions of divider(s) 130 within the container 105 to the control system 190, etc. The manipulation tool 120 can use the received information to determine which commands (e.g., stop command, start command, speed adjustment command, etc.) to send to the actuator(s) 145 and/or actuator(s) 150. The network interface 170 may communicate using a wired communication protocol (e.g., Ethernet), a wireless communication protocol (e.g., WiFi), or combinations thereof.

In some embodiments, the control system 190 controls each of the actuator(s) 145 and actuator(s) 150 via a respective (local) controller 160. For example, the controller 160 can receive (e.g., via the network interface 170) control signals (or commands) from the control system 190, and issue corresponding commands to the respective actuator 145 or actuator 150 in order to control the operation of the actuator. Similarly, each controller 160 can transmit information (e.g., actuator feedback, sensor feedback, etc.) to the control system 190 via the network interface 170. The controller 160 can include solely hardware and firmware or can include combinations of hardware and software elements. In one embodiment, the controller 160 is a processor or a micro-controller.

Note FIG. 1 illustrates a reference example of a manipulation tool 120. In other embodiments, the manipulation tool 120 can have a different configuration consistent with the functionality described herein. For example, while the manipulation tool 120 in FIG. 1 is depicted with sensor(s), actuator(s), controller(s), and a network interface, in other embodiments, the manipulation tool 120 may include any one of or combination of sensor(s), actuator(s), controller(s), and network interface(s). In one particular embodiment, the manipulation tool 120 may include actuator(s) 145 and actuator(s) 150, but may not include sensor(s) 140. In such an embodiment, the manipulation tool 120 can be used to perform an automatic opening of the adjustable container. For example, the manipulation tool 120 via the actuator(s) 145 and actuator(s) 150 may move the dividers from an arbitrary position to a default (e.g., open) position.

Figure 2:
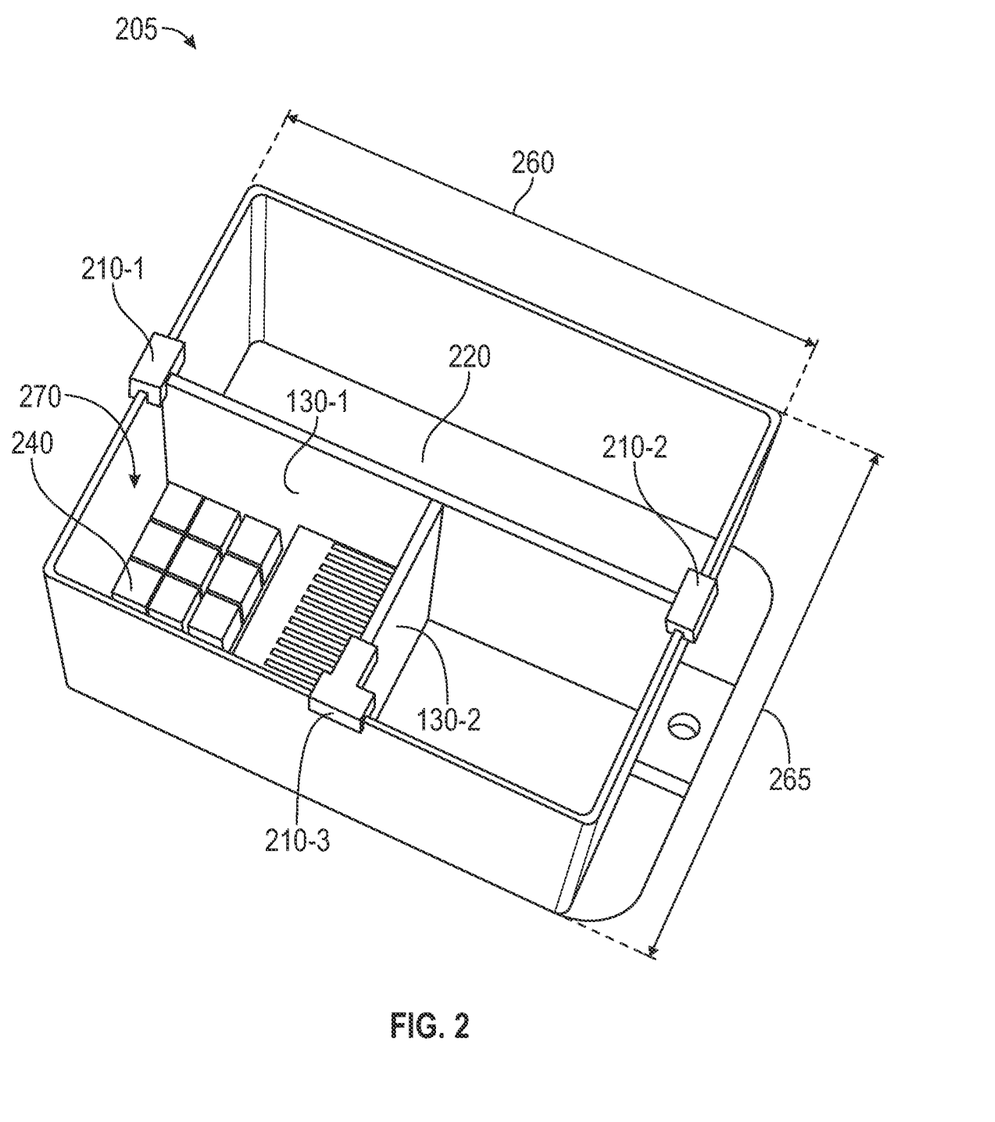
FIG. 2 illustrates an example adjustable container, according to one embodiment.

FIG. 2 illustrates an example of a container 205 with one or more adjustable dividers (e.g., dividers 130), according to one embodiment. The container 205 is a reference example of the container 105 depicted in FIG. 1. As shown in the depicted embodiment, the container 205 includes two dividers 130-1 and 130-2, each of which is adjustable. That is, each divider 130-1 and 130-2 can be moved to different positions within the container 205 in order to form the (containing) area 270 around one or more items 240. In particular, the divider 130-1 is adjustable in a horizontal direction 265 (e.g., y direction) and the divider 130-2 is adjustable in a horizontal direction 260 (e.g., x direction). The dividers 130 1-2 may be formed from various materials, including, for example, plastic, wood, metal, rubber, foam, etc.

In this embodiment, the container 205 also includes manipulation members 210 1-3 (also referred to as manipulation elements). Each manipulation member 210 can be used to move a divider 130 to a different position within the container 205 and/or fix (or secure or hold or lock) the divider 130 into a desired position within the container 205. For example, the manipulation members 210-1 and 210-2 can be used to move the divider 130-1 and the manipulation member 210-3 can be used to move the divider 130-2. Each manipulation member 210 is generally attached to a divider 130 at one end of the manipulation member 210, and the other end of the manipulation member is configured to engage a side of the container 205 in order the divider 130 in a fixed position.

The manipulation member(s) 210 may be formed from a variety of materials, including, for example, plastic, wood, metal, rubber, foam, etc. The manipulation members 210 may have any configuration suitable for moving a divider 130 to different positions within the container 205 and/or fixing the divider 130 into a desired position within the container 205. In one embodiment, the manipulation member 210 is a handle, having one end that is configured to engage the side of the container 205 in order to keep the divider 130 in a fixed position. In some embodiments, a top portion of each manipulation member 210 includes a recessed portion (or cavity).

As shown, the container 205 may also include an inner bottom surface 220, which may be folded (or otherwise removable) in order to allow items within the area 270 to be removed from the container 205. Note that the container 205 illustrated in FIG. 2 is one reference example of the container 105 described relative to FIG. 1, and that the container 105 described herein may have different configurations consistent with the functionality described herein. For example, a container 105 may have any number of dividers 130 and/or any number of manipulation members 210.

Figure 3A:
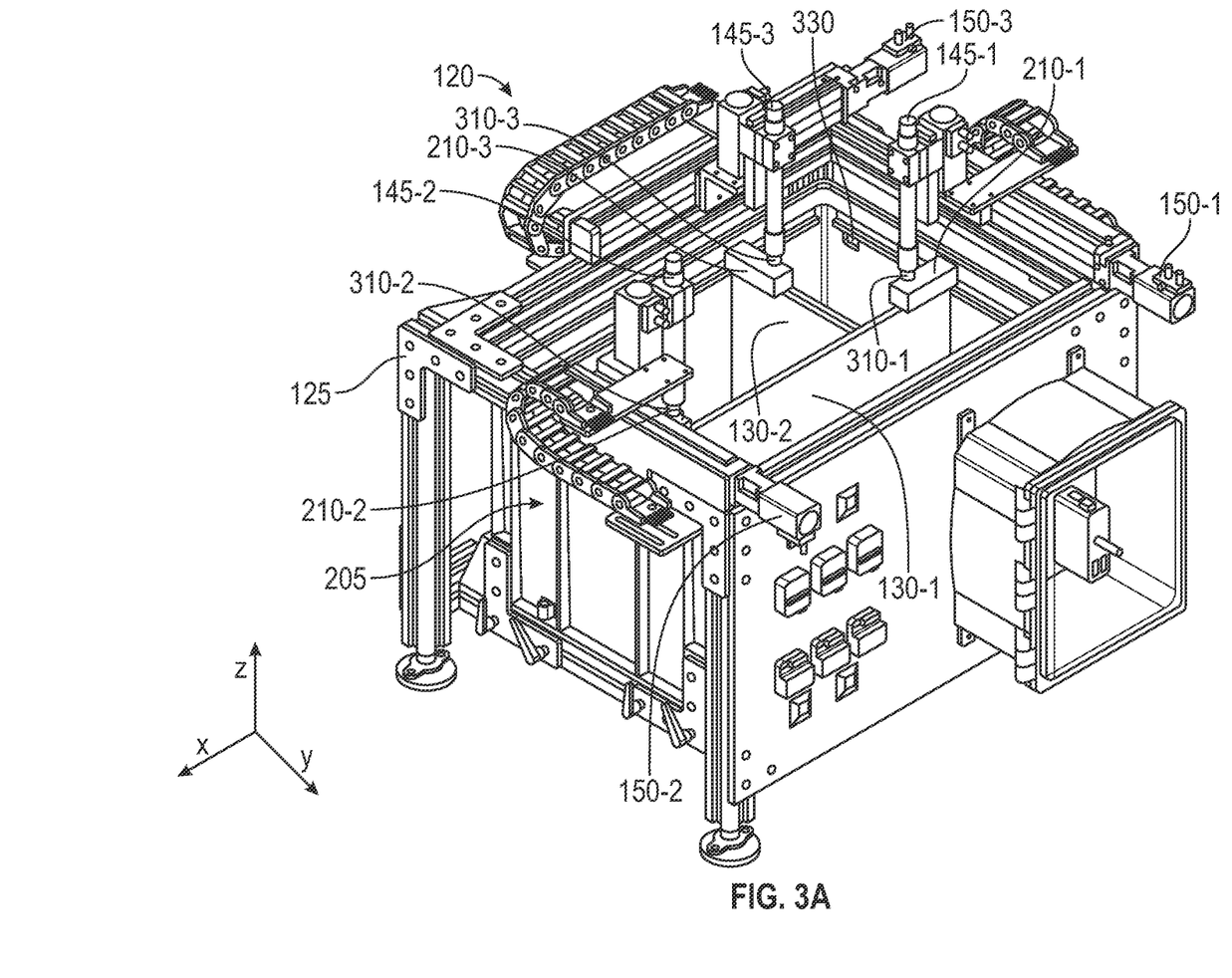
FIG. 3A illustrates a perspective view of a manipulation tool, according to one embodiment.
Figure 3B:
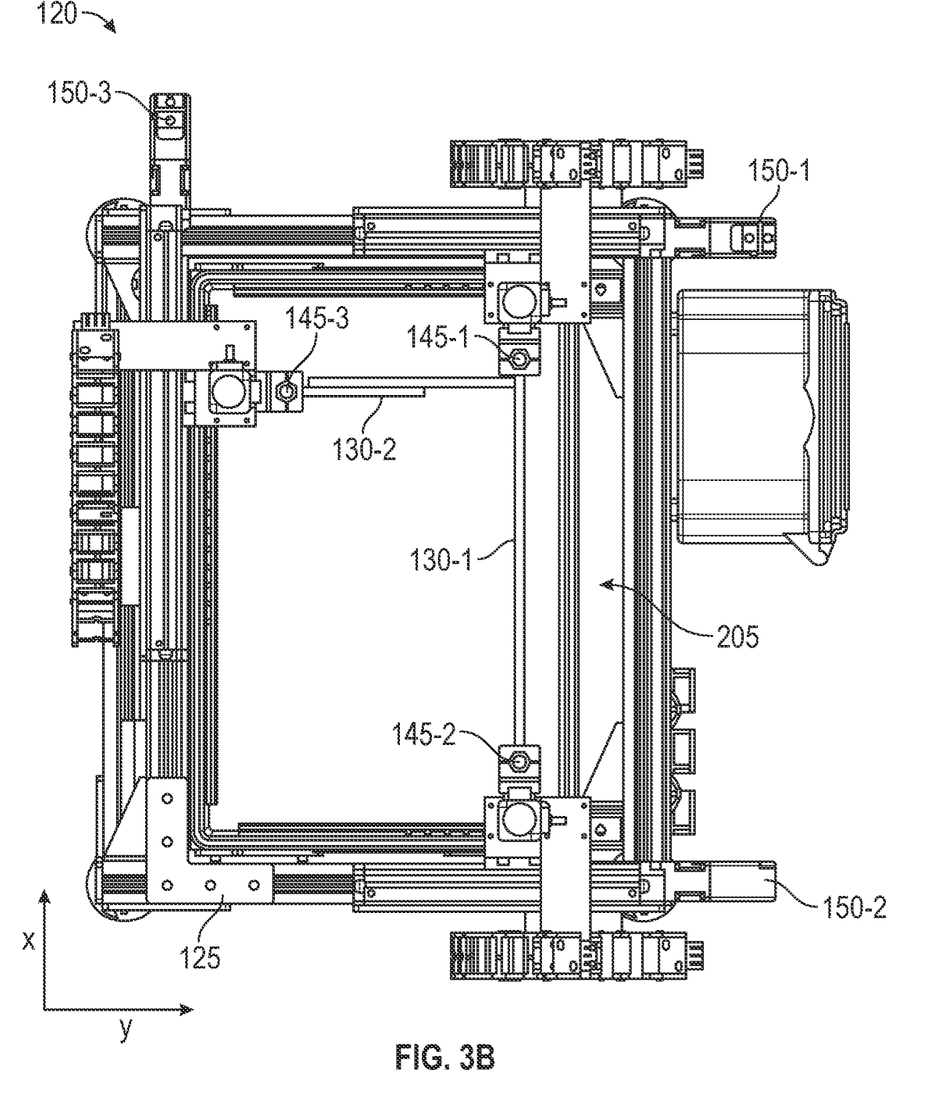
FIG. 3B illustrates a top view of a manipulation tool, according to one embodiment.
Figure 3C:
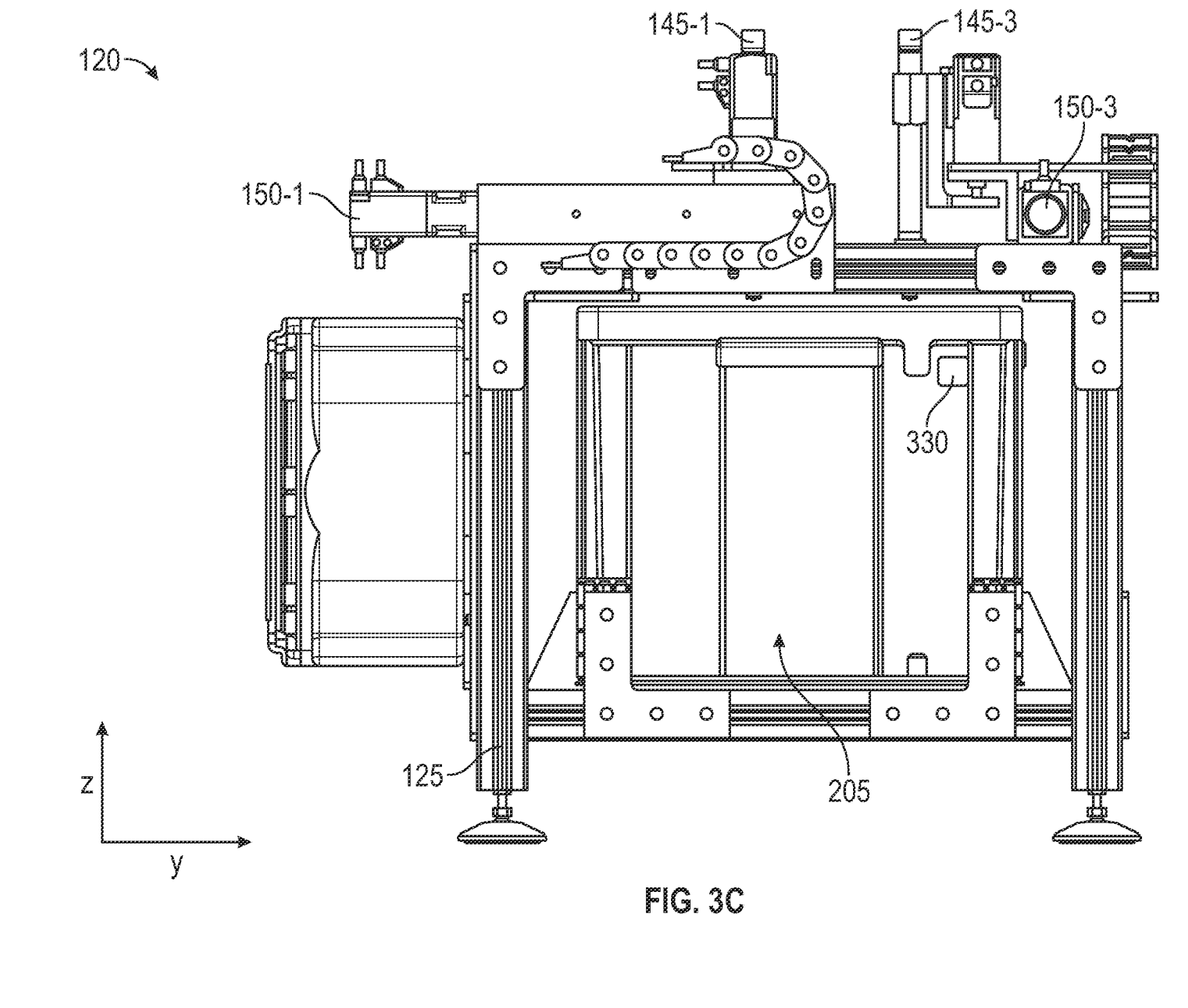
FIG. 3C illustrates a side view of a manipulation tool, according to one embodiment.

FIGS. 3A, 3B, and 3C illustrate different views of an example manipulation tool 120, according to one embodiment. In particular, FIG. 3A illustrates a perspective view of the manipulation tool 120, FIG. 3B illustrates a top view of the manipulation tool 120, and FIG. 3C illustrates a side view of the manipulation tool 120, according to one embodiment. As shown in the depicted embodiment, the manipulation tool 120 includes three actuators 145 (e.g., actuator 145-1, actuator 145-2, and actuator 145-3) and three actuators 150 (e.g., actuator 150-1, actuator 150-2, and actuator 150-3). An end-effector 310 is attached to each actuator 145 at an end of the respective actuator 145. In one embodiment, each actuator 145 is configured to move the respective end-effector 310 in a vertical direction (e.g., along z-axis) in order to engage or disengage a divider 130.

For example, the actuator 145-1 is configured to drive the end-effector 310-1 in a downward vertical direction (e.g., −z direction) to engage the manipulation member 210-1 attached to the divider 130-1. The actuator 145-1 is also configured to drive the end-effector 310-1 in an upward vertical direction (e.g., +z direction) to disengage from the manipulation member 210-1 attached to the divider 130-1. When the end-effector 310-1 engages the manipulation member 210-1 (e.g., by applying force to one end of the manipulation member), the manipulation member 210-1 disengages from a side of the container 205, allowing the divider 130-1 to be moved in a horizontal direction (e.g. y direction). Similarly, when the end-effector 310-1 disengages from the manipulation member 210-1, the handle 210-1 reengages the side of the container 205, stopping movement of the divider 130-1.

Similarly, the actuator 145-2 is configured to drive the end-effector 310-2 in a downward vertical direction (e.g., −z direction) to engage the manipulation member 210-2 attached to the divider 130-1. The actuator 145-2 is also configured to drive the end-effector 310-2 in an upward vertical direction (e.g., +z direction) to disengage from the manipulation member 210-2 attached to the divider 130-1. When the end-effector 310-2 engages the manipulation member 210-2 (e.g., by depressing the recessed portion of the notch 280-2), the manipulation member 210-2 disengages from a side of the container 205, allowing the divider 130-1 to be moved in a horizontal direction (e.g. y direction). Similarly, when the end-effector 310-2 disengages from the manipulation member 210-2, the manipulation member 210-2 reengages the side of the container 205, stopping movement of the divider 130-1.

Additionally, the actuator 145-3 is configured to drive the end-effector 310-3 in a downward vertical direction (e.g., −z direction) to engage the manipulation member 210-3 attached to the divider 130-2. The actuator 145-3 is also configured to drive the end-effector 310-3 in an upward vertical direction (e.g., +z direction) to disengage from the manipulation member 210-3 attached to the divider 130-2. When the end-effector 310-3 engages the manipulation member 210-3 (e.g., by applying force to one end of the manipulation member 210-3), the manipulation member 210-3 disengages from a side of the container 205, allowing the divider 130-2 to be moved in a horizontal direction (e.g. x direction). Similarly, when the end-effector 310-3 disengages from the manipulation member 210-3, the manipulation member 210-3 reengages the side of the container 205, stopping movement of the divider 130-2.

Although not shown, in certain embodiments, the side of the container 205 may include one or more notches that can be used to keep a divider 130 fixed (or locked) in a particular position. For example, in such embodiments, when the end-effector 310 engages one end of the manipulation member 210, the other end of the manipulation member 210 may disengage from one of the notches, allowing for the divider 130 to be moved within the container 205. Similarly, when the end-effector 310 disengages from one end of the manipulation member 210, the other end of the manipulation member 210 may (re)engage one of the notches, fixing the divider 130 at a particular position within the container 205.

Each actuator 150 may be coordinated with a respective actuator 145. In some embodiments, each actuator 150 may be coupled to a respective actuator 145. Here, for example, actuator 150-1 is coupled to actuator 145-1, actuator 150-2 is coupled to actuator 145-2, and actuator 150-3 is coupled to actuator 145-3. Each actuator 150 is configured to provide motion of the divider 130 in horizontal direction (e.g., x or y direction). For example, actuator 150-1 is configured to move the divider 130-1 in a horizontal direction (e.g., y direction), while the actuator 145-1 drives the end-effector 310-1 (e.g., in a vertical direction, such as -z direction) to engage the manipulation member 210-1 attached to the divider 130-1. Additionally, actuator 150-2 is configured to move the divider 130-1 in a horizontal direction (e.g., y direction), while the actuator 145-2 drives the end-effector 310-2 (e.g., in a vertical direction, such as -z direction) to engage the manipulation member 210-2 attached to the divider 130-1. Additionally, actuator 150-3 is configured to move the divider 130-2 in a horizontal direction (e.g., x direction), while the actuator 145-3 drives the end-effector 310-3 (e.g., in a vertical direction, such as -z direction) to engage the manipulation member 210-3 attached to the divider 130-2.

In one embodiment, the operation of at least one of (i) the actuators 145-1 and 145-2 or (ii) the actuators 150-1 and 150-2 may be synchronized in order to adjust the position of the divider 130-1. For example, in such an embodiment, the actuators 150-1 and 150-2 may be electrically linked (or coupled) to allow for synchronized control (or operation). In another embodiment, the actuators 150-1 and 150-2 may be mechanically linked (or coupled), e.g., via a driveshaft, in order to allow for synchronized control (or operation). In one embodiment, one or more sensors 140 may be deployed in various locations on the gantry 125. As shown in FIG. 3A and FIG. 3C, in some cases, a sensor(s) 140 may be deployed within a port location 330 located within the container 205.

Note that the manipulation tool 120 depicted in FIGS. 3A-3C is provided as a reference example of a manipulation tool that can be used to automatically adjust position of a divider within a container, and that the manipulation tool 120 described herein may have other configurations consistent with the functionality described herein. For example, while the manipulation tool 120 depicted in FIGS. 3A-3C includes three actuators 145 and three actuators 150, in other embodiments, the manipulation tool 120 may have any number of actuators 145 and/or any number of actuators 150. For example, in certain embodiments, the manipulation tool 120 may be configured with 2 actuators 150 (instead of 3 actuators) when the motors 150-1 and 150-2 are mechanically linked (e.g., via a driveshaft (not shown)).

Figure 4A:
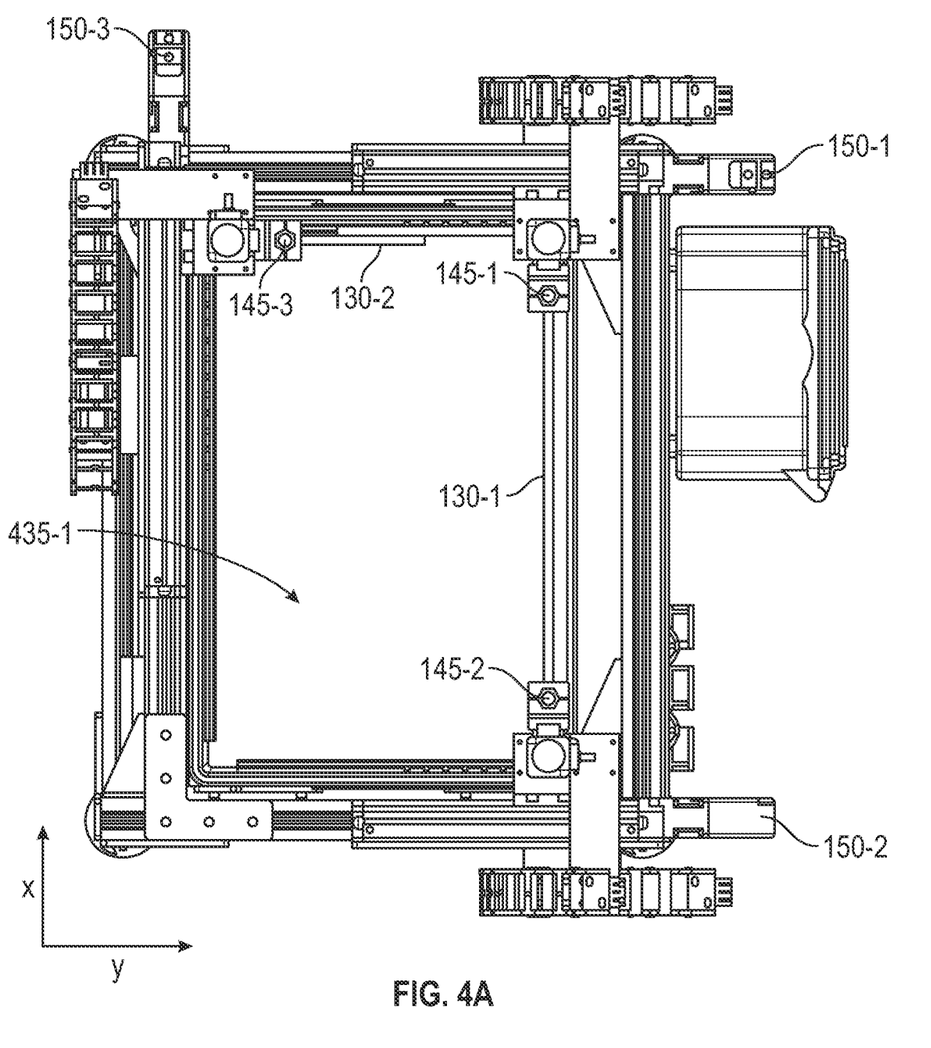
FIGS. 4A-4C illustrate an example scenario of using a manipulation tool to manipulate an adjustable container, according to one embodiment.
Figure 4B:
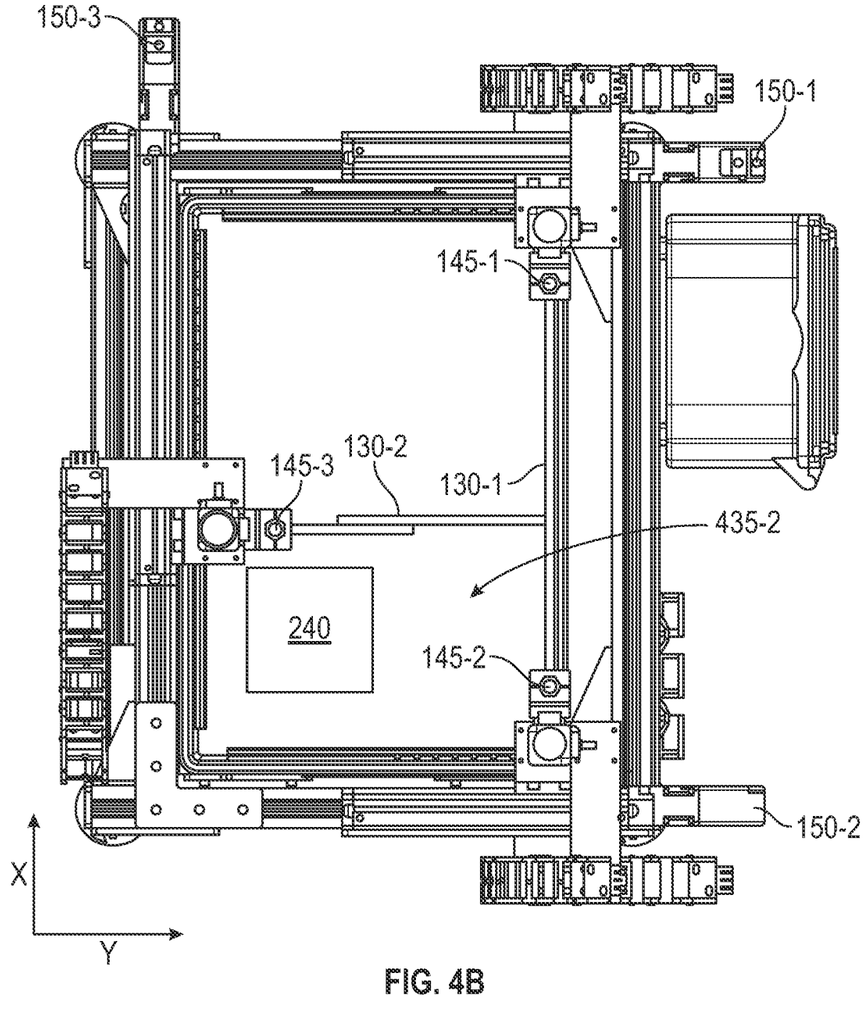
Figure 4C:
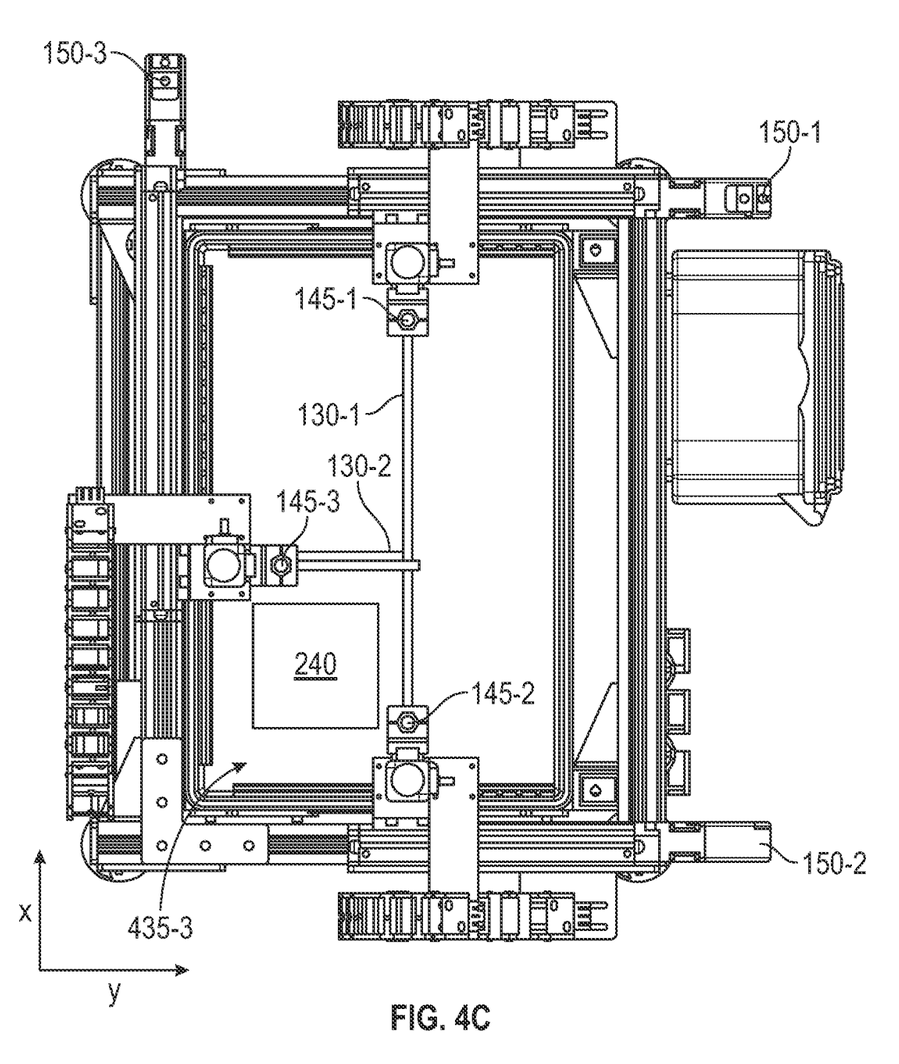

FIGS. 4A-4C illustrate an example scenario 400 of the manipulation tool 120 manipulating an adjustable container, according to one embodiment. The control system 190 is configured to independently control the actuator(s) 145 and actuator(s) 150, based on sensor feedback and actuator feedback in order to automatically adjust dividers 130 of the container 205 in order to form a containing area 435-3 for item(s) 240.

In FIG. 4A, the control system 190 controls the actuators 145 1-3 and actuators 150 1-3 to move the dividers 130 1-2 to "default" positions. As shown, the "default" positions are positions of the dividers 130 1-2 that results in the area 435-1, which is the maximum possible area within the container 205. As shown in FIG. 4B, after an item(s) 240 is inserted (or placed) into the container 205, the control system 190 drives actuator 145-3 to engage a manipulation member 310-3 attached to the divider 130-2, allowing movement of the divider 130-2. While the manipulation member 310-3 is engaged, the control system 190 drives actuator 150-3 to move the divider 130-2 to a predetermined position along the x axis, resulting in the area 435-2.

Similarly, as shown in FIG. 4C, after an item(s) 240 is inserted into the container 205, the control system 190 drives actuators 145 1-2 to engage respective manipulation members 310 1-2, which are attached to the divider 130-1, allowing movement of the divider 130-1. While the manipulation members 310 1-2 are engaged, the control system 190 drives actuators 150 1-2 (in a synchronous manner) to move the divider 130-1 to a predetermined position along the y axis, resulting in the area 435-3. The area 435-3 may be used to form packaging having the minimum possible volume, which includes item(s) 240 within the container 205.

Figure 5:
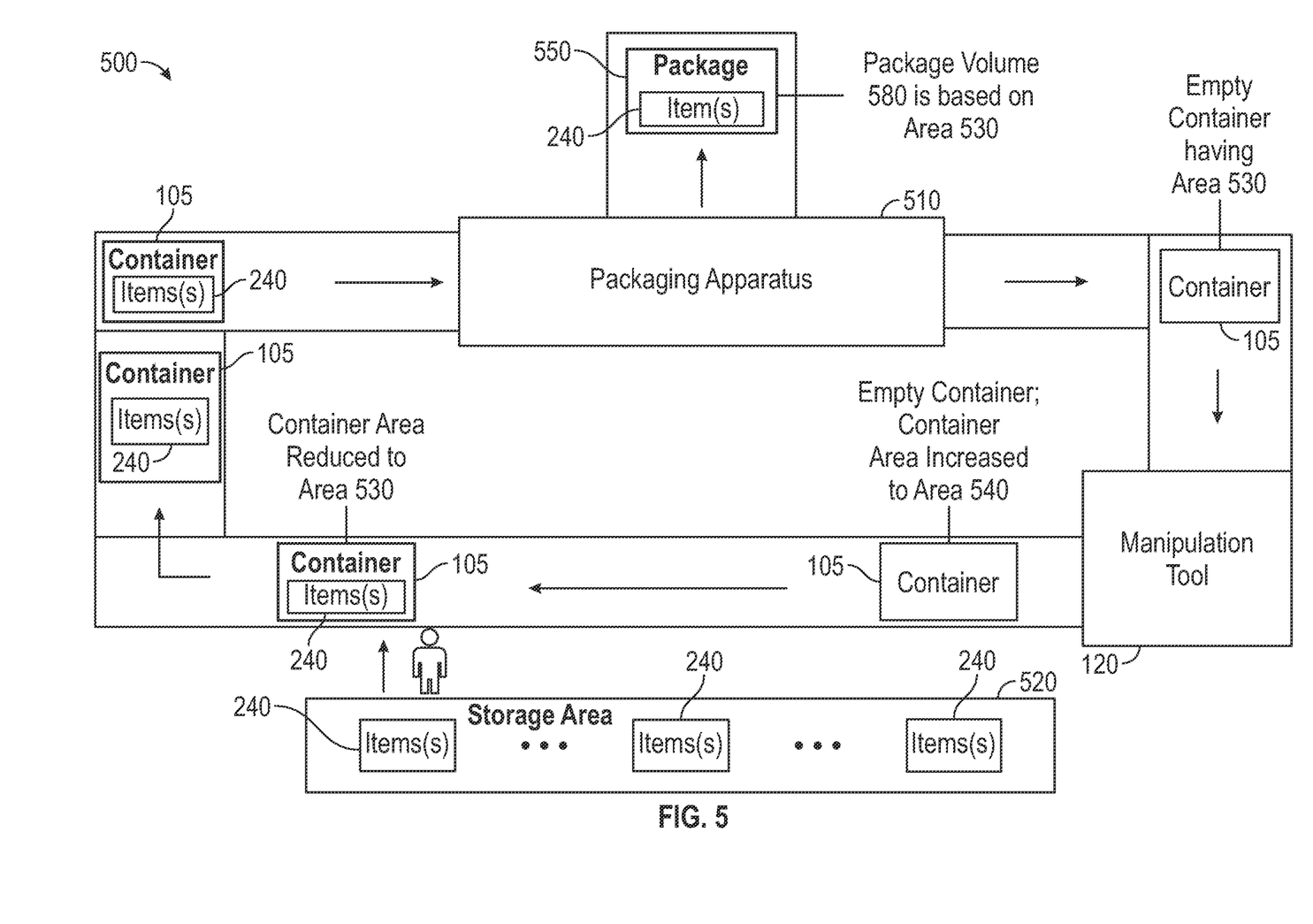
FIG. 5 illustrates an example system for manipulating an adjustable container, according to one embodiment.

FIG. 5 illustrates an example system 500, according to one embodiment. The system 500 may be used for creating packages with one or more items 240. As shown, the system 500 includes a packaging apparatus 510, a storage area 520, and a manipulation tool 120. The storage area 520 is representative of a holding area for one or more items 240. In one embodiment, the storage area 520 can be used as a picking station where an operator obtains items and places the items into one or more containers for downstream facility operations, such as packaging operations.

Here, for example, an operator may obtain an item(s) 240 from the storage area and insert the item(s) 240 into a container 105 having one or more dividers 130. The operator may adjust the divider(s) 130 such that the item(s) 240 are compacted into a containing area 530. The container 105 may then transition to the packaging apparatus 510 (e.g., on a conveyor system).

The packaging apparatus 510 is generally configured to create custom packages for one or more items. For example, the packaging apparatus 510 may continually receive packaging material (e.g., corrugated cardboard) and form a unique package 550 (e.g., box) for a set of items 240 using the packaging material. Here, the packaging apparatus 510 receives the container 105 having the set of items 240 compacted into a containing area 530. As the container 105 enters the packaging apparatus 510, the packaging apparatus 510 is configured to obtain the set of items 240 (from the containing area 530), place the set of items 240 into the unique package 550, output the unique package 550 for downstream facility operations (e.g., shipping), and recirculate the emptied container 105 (with the containing volume 530) towards the storage area 520. The package 550 that is created may have dimensions based at least in part on the containing area 530. For example, the package 550 may also have an area equal to the containing area 530. Additionally, the package 550 may have a volume that is the minimum possible volume for holding the item(s) 240. For example, the height of the package 550 (e.g., z-axis) may be defined by the maximum height of the item(s) 240 relative to the bottom surface 220 of the container 105.

In one embodiment, the manipulation tool 120 is configured to receive the empty container 105 (with the containing area 530) and automatically adjust a position of the divider (s) to a default position. For example, the manipulation tool 120 can move the divider(s) to increase the containing area from area 530 to area 540. The manipulation tool 120 may then output the container 105 having the containing area 540 so that it can be used for another facility operation.

Figure 6:
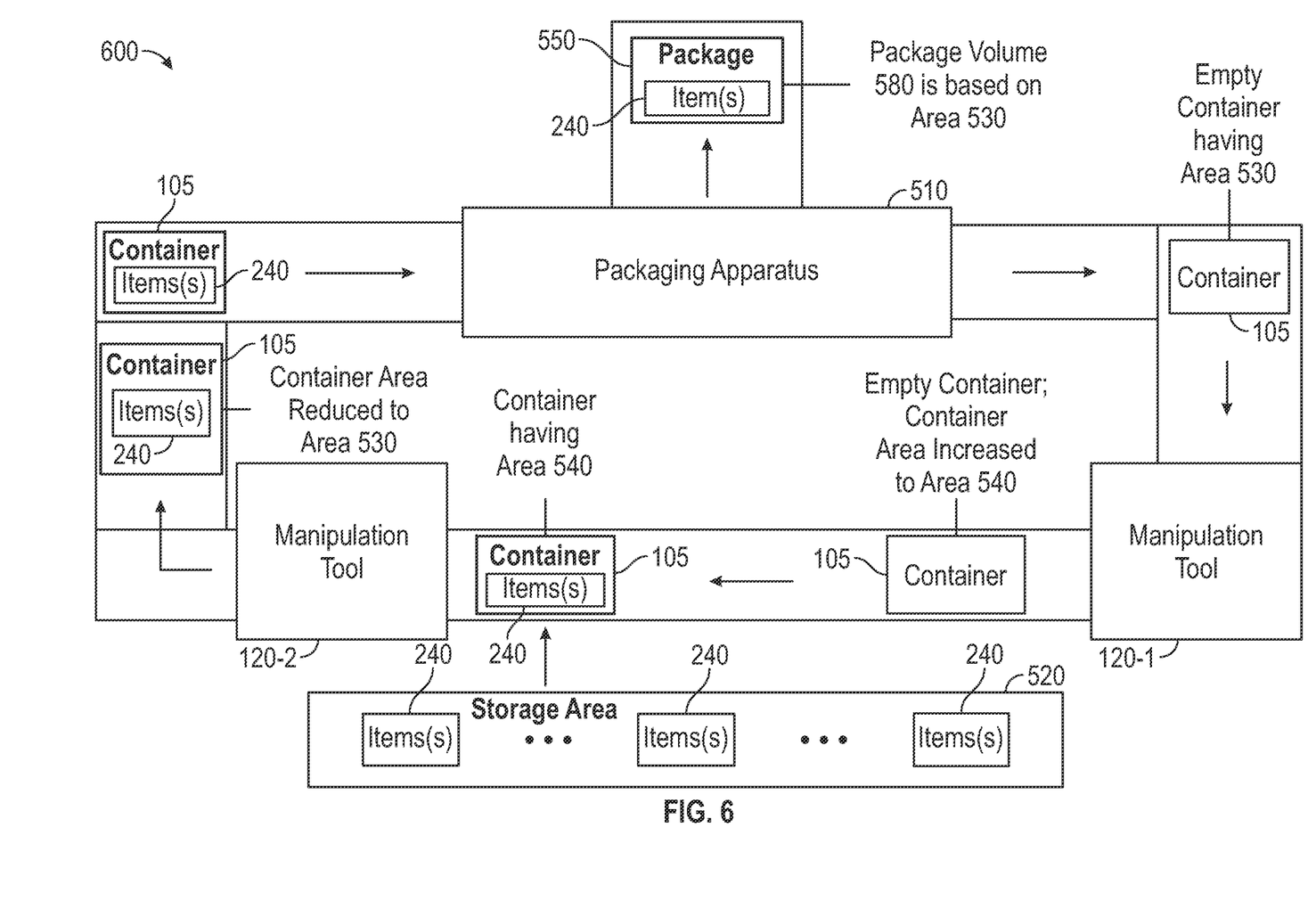
FIG. 6 illustrates another example system for manipulating an adjustable container, according to one embodiment.

FIG. 6 illustrates another example system 600, according to one embodiment. The system 600 may be used for creating packages with one or more items 240. As shown, the system 600 includes a packaging apparatus 510, a storage area 520, a manipulation tool 120-1, and a manipulation tool 120-2.

Compared to the system 500, the system 600 employs two manipulation tools 120 (e.g., manipulation tool 120-1 and manipulation tool 120-2) to automatically adjust a container 105. For example, the manipulation tool 120-1 is configured to move dividers 130 of an empty container (output from the packaging apparatus 510) to a default position. As shown, the manipulation tool 120-1 receives an empty container 105 having a containing area 530 and outputs an empty container 105 having an increased containing area 540. The manipulation tool 120-2 is configured to receive a container 105 having item(s) 240 inserted into the containing area 540 and is configured to adjust the divider(s) 130 within the container 105 to reduce the containing area to area 530. The container 105 with the containing area 530 is then transitioned into the packaging apparatus 510.

Figure 7:
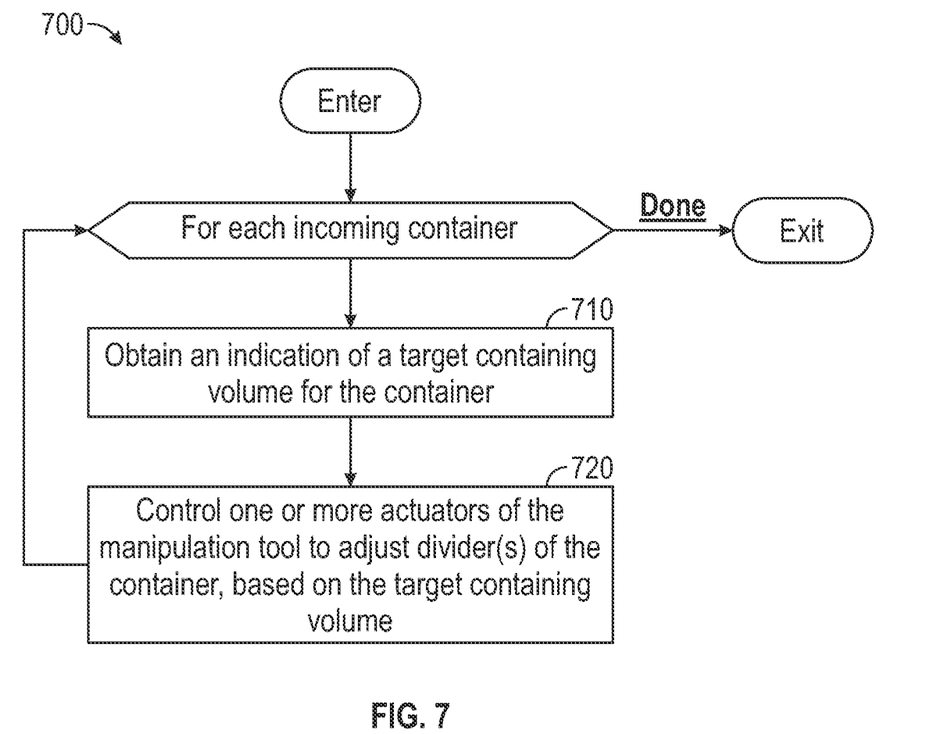
FIG. 7 is a flowchart illustrating a method for controlling a system for manipulating adjustable containers, according to one embodiment.

FIG. 7 is a flowchart illustrating a method 700 for controlling a system for manipulating adjustable containers, according to one embodiment. The method 700 may be performed by the control system 190 for each incoming container.

Method 700 enters at block 710, where the control system 190 obtains an indication of a target containing volume for the container. For example, the target containing volume may be based on information indicating at least one of an item type, a size, or dimensions of each item to be included within the target containing volume. In one embodiment, the target containing volume may be a minimum possible volume for a set of items. In one embodiment, the target containing volume may be a maximum possible volume for the container. In this embodiment, for example, the control system 190 may control a manipulation tool to automatically adjust the containing area of emptied containers to a default target area, where the amount of space in the z direction is at least temporarily fixed prior to the container being inducted into a packaging apparatus (e.g., packaging apparatus 510).

At block 720, the control system 190 controls one or more actuators of the manipulation tool to adjust divider(s) of the container, based on the target containing volume. In one embodiment, the control system 190 may control at least a first set of actuators to allow for movement of the divider(s) within the container and may control at least a second set of actuators to move the divider(s) within the container, in order to form a containing area (e.g., containing area 530) within the container for one or more items.

Figure 8:
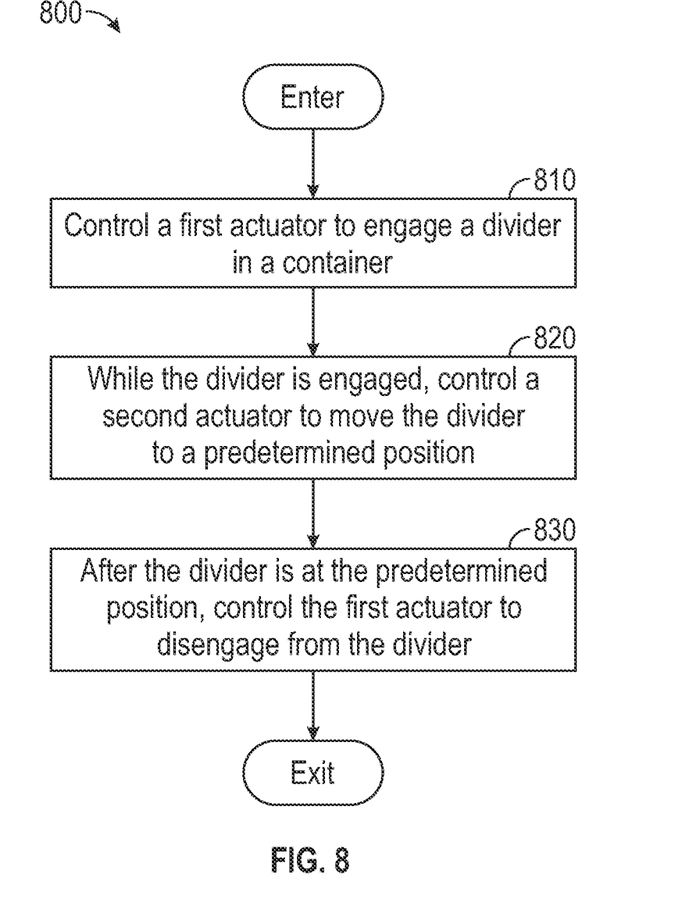
FIG. 8 is a flowchart illustrating a method for controlling a manipulation tool to manipulate an adjustable container, according to one embodiment.

FIG. 8 is a flowchart illustrating a method 800 for controlling a manipulation tool to manipulate an adjustable container, according to one embodiment. The method 800 may be performed by the control system 190. In one embodiment, the method 800 may be performed as part of the operations in block 720 of method 700 illustrated in FIG. 7. For example, the method 800 may be performed for each set of actuators coupled to a divider within a container.

Method 800 enters at block 810, where the control system 190 controls a first actuator (e.g., actuator 145) to engage a divider (e.g., divider 130) in a container (e.g., container 205). For example, in one embodiment, the first actuator may move an end-effector (e.g., end-effector 310) in a vertical direction (e.g., −z direction) to engage a manipulation member (e.g., manipulation member 210) attached to the divider. As described, in such an example, the engagement of the manipulation member by the end-effector may disengage the divider from a side of the container, allowing for the divider to be moved in a horizontal direction to different positions within the container.

At block 820, the control system 190 controls a second actuator (e.g., actuator 150) to move the divider to a predetermined position, while the divider is engaged by the first actuator. For example, the second actuator may move the divider in a horizontal direction (e.g., x or y direction) until the divider is at a predetermined position.

At block 830, the control system 190 controls the first actuator to disengage from the divider, after the divider is at the predetermined position. For example, the first actuator may move the end-effector (e.g., end-effector 310) in a vertical direction (e.g., +z direction) to disengage from the manipulation member attached to the divider. When the end-effector disengages from the manipulation member, the manipulation member may reengage the divider to the side of the container, fixing the divider at the predetermined position.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus comprising:
   a gantry; and
   a plurality of actuators attached to the gantry, the plurality of actuators being adapted to automatically adjust, in a horizontal direction, one or more dividers within a container to form a first area within the container for one or more items, wherein the container comprises a base extending in a horizontal plane, and vertical walls extending perpendicularly to the base.

2. The apparatus of claim 1, wherein the plurality of actuators comprise:
   a first actuator configured to engage a first divider of the one or more dividers to allow the first divider to be moved within the container; and
   a second actuator configured to move the first divider to a first position within the container while the first divider is engaged by the first actuator.

3. The apparatus of claim 2, wherein the first actuator is further configured to disengage from the first divider after the first divider has been moved to the first position.

4. The apparatus of claim 2, wherein the plurality of actuators further comprise:
   a third actuator configured to engage a second divider of the one or more dividers to allow the second divider to be moved within the container; and
   a fourth actuator configured to move the second divider to a second position within the container while the second divider is engaged by the third actuator.

5. The apparatus of claim 4, wherein:
   the first position is located along a first axis of the container; and
   the second position is located along a second axis of the container.

6. The apparatus of claim 2, wherein the plurality of actuators further comprise:
   a third actuator configured to engage the first divider to allow the first divider to be moved within the container; and
   a fourth actuator coupled to the third actuator and configured to move the first divider to the first position within the container while the first divider is engaged by the third actuator.

7. The apparatus of claim 6, wherein an operation of the second actuator and an operation of the fourth actuator are synchronized.

8. The apparatus of claim 6, wherein the second actuator and the fourth actuator are mechanically coupled.

9. The apparatus of claim 2, further comprising one or more sensors configured to detect the first position.

10. The apparatus of claim 1, wherein the first area is a minimum possible area for the one or more items.

11. The apparatus of claim 1, wherein, after the first area is formed within the container, the plurality of actuators are further adapted to automatically adjust the one or more dividers within the container to form a second area, greater than the first area, within the container.

12. The apparatus of claim 11, wherein the second area is a maximum possible area that can be formed within the container.

13. The apparatus of claim 1, further comprising an end effector attached to an actuator of the plurality of actuators and vertically movable by the actuator, wherein the end effector is configured to engage or disengage from the dividers to facility adjusting of the dividers.

* * * * *